United States Patent [19]

Knight et al.

[11] 4,135,551
[45] Jan. 23, 1979

[54] MODIFIED DRY-BREAK COUPLER

[75] Inventors: Houston W. Knight, Whittier; Harold M. Gibbons, Long Beach, both of Calif.

[73] Assignee: FMC Corporation, San Jose, Calif.

[21] Appl. No.: 801,718

[22] Filed: May 31, 1977

[51] Int. Cl.² .................... F16L 29/00; F16L 37/28
[52] U.S. Cl. ...................... 137/614.06; 251/149.9
[58] Field of Search ........... 137/614.06; 251/149.9; 285/320

[56] References Cited

U.S. PATENT DOCUMENTS

| | | | |
|---|---|---|---|
| 2,872,216 | 2/1959 | Kaiser | 251/149.9 |
| 4,030,524 | 6/1977 | McMath et al. | 137/614.06 |

*Primary Examiner*—Martin P. Schwadron
*Assistant Examiner*—A. Michael Chambers
*Attorney, Agent, or Firm*—W. W. Ritt, Jr.; J. W. Edwards

[57] ABSTRACT

A dry-break coupler attaches to an adapter for loading fluid into the bottom of a tank. The coupler and the adapter can be connected or separated without the loss of fluid, while both fittings are subjected to internal fluid pressure. The coupler is of the type used on a gasoline tank truck loading arm, and the adapter is in accordance with the standards of the American Petroleum Institute. The coupler has a tubular body that defines a central flow passage and a movable valve closure element that opens and closes the coupler flow passage. This valve closure element also actuates a central valve of an adjacent adapter. An adapter latch is mounted upon a first rotatable shaft that is pivotally mounted on the coupler tubular body. A second rotatable shaft that operates the valve closure element is mounted within the tubular body. Portions of both the first and second rotatable shafts extend in substantially parallel relationship. Mounted on the shafts is a mechanism interconnecting the shafts for both pivoting the adapter latch into locking engagement with the adapter before the valve closure element opens the flow passage and holding the adapter latch in a locked position while the flow passage is open. A single handle operates both the first and the second rotatable shafts.

9 Claims, 8 Drawing Figures

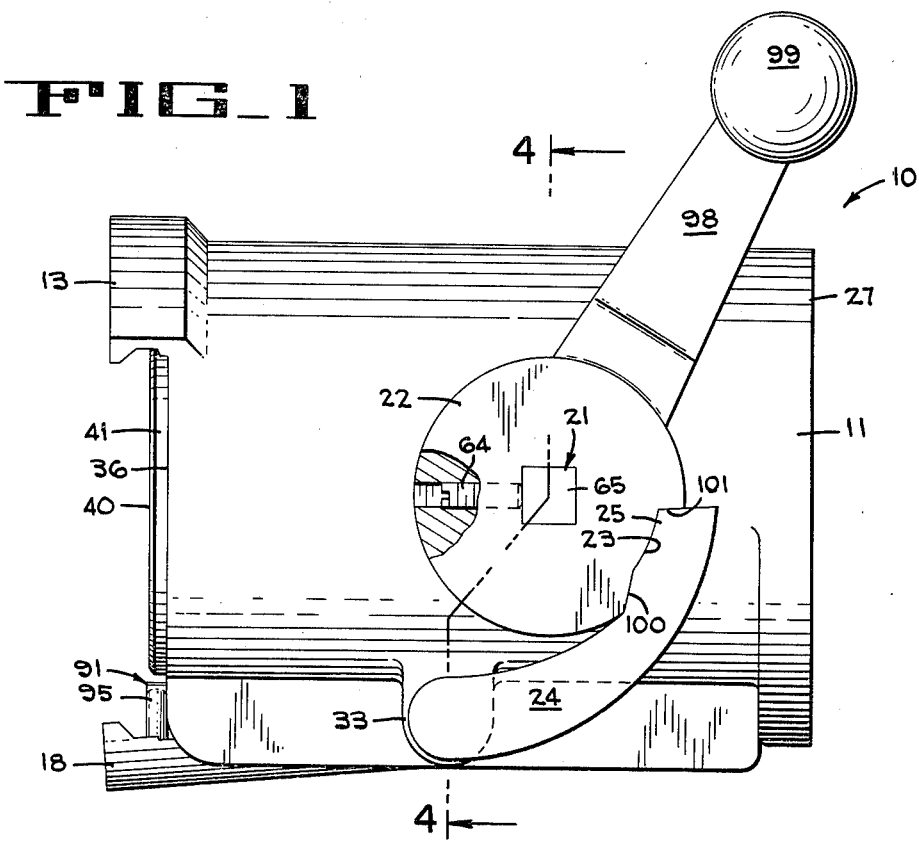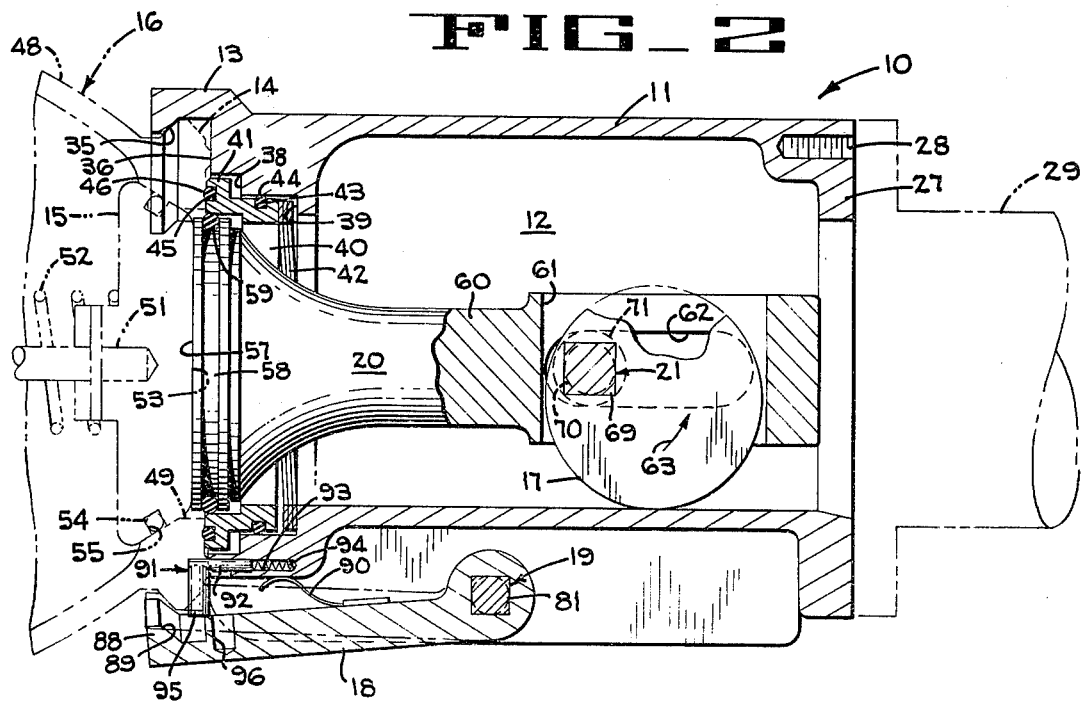

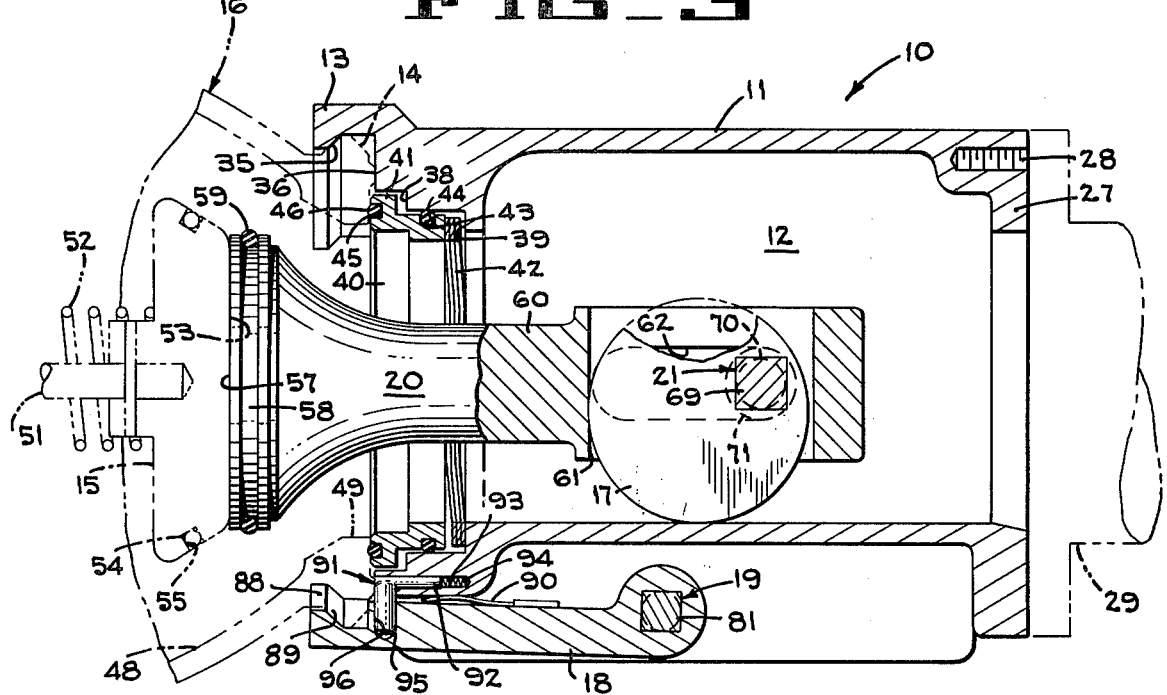

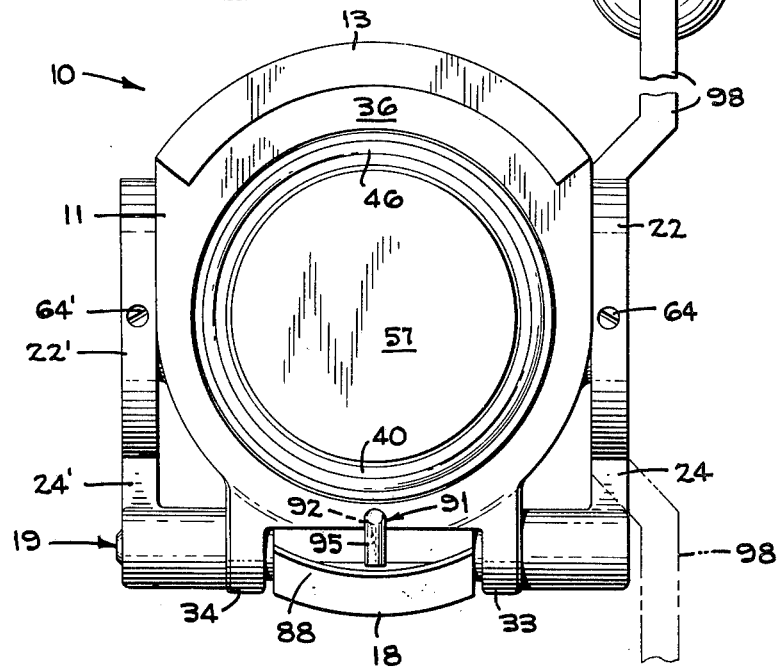
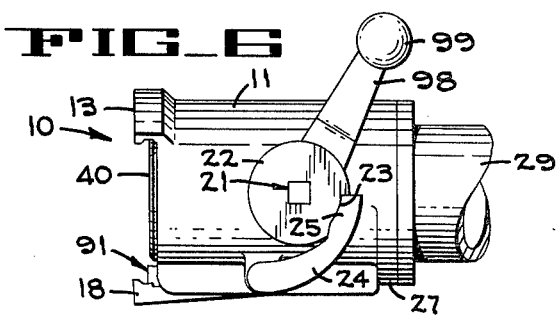
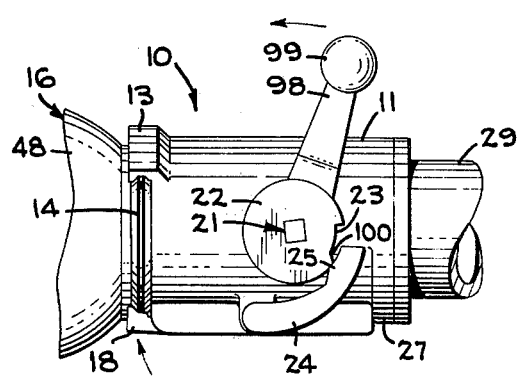
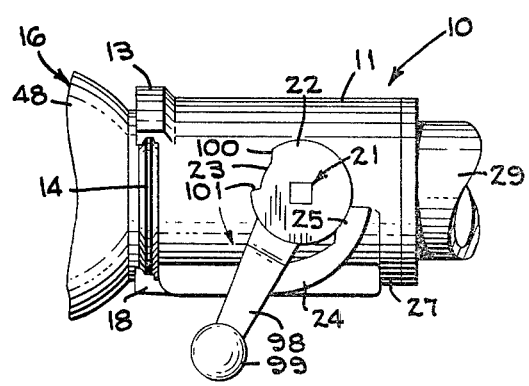

MODIFIED DRY-BREAK COUPLER

BACKGROUND OF THE INVENTION

1. Field of the Invention

This invention relates to a dry-break coupler that can be connected in series with a valved adapter to define a flow passage for fluid. Upon separation, internal valves within both the coupler and the adapter block fluid flow therein towards the opposite member.

2. Description of the Prior Art

Known dry-break couplers have internal valves for regulating fluid flow. These couplers also have external couplings for attachment to adapters. Controls are required for operating both the valves and the couplings. It is necessary for an operator to hold the coupler in a coupling position with the adapter, then operate the controls for latching the coupler to the adapter and for opening the valve so as to allow fluid to flow from the coupler into the adapter. These operations can be difficult to perform by a single operator, since they normally require the use of both of the operator's hands to operate the control. Often the operator uses his body to hold the coupler in position with the adapter, while he operates the controls with his hands. Should the operator inadvertently open the valve before the coupler is latched to the adapter or should he unlatch the coupler before the valve is closed to block the flow of fluid, an accident would result, unless safety control features were provided to prevent such action.

Dry break couplers having internal valves for preventing the loss of fluid from an uncoupled coupler are shown in U.S. Pat. Nos. 3,473,569; 3,474,827; 3,884,448; and 3,897,091. Cams for operating valve closure elements are shown in U.S. Pat. Nos. 806,970 and 2,662,721. A coupling latch with a pivotable pawl that is controlled by a double pivotally connected handle is disclosed in U.S. Pat. No. 3,897,091. An interlocking mechanism that includes a disc with two arcuate cutouts, on diametrically opposite sides of the disc periphery, for receiving cylindrical members is shown in U.S. Pat. No. 3,693,655.

In view of the prior art, there remains a need for a dry-break coupler that is light in weight, that can be readily handled, that can be operated by one hand of an operator with the same hand performing both the coupler latching operation and valve opening operation, that has safety features to prevent inadvertent operations by the operator resulting in accidental loss of fluid, that has a single guide system for the valve closure element to prevent such element from binding, and that has a simple clamping mechanism for latching the coupler to an adapter.

SUMMARY OF THE INVENTION

A dry-break coupler has a tubular body that defines a central flow passage. An adapter latch and a first rotatable shaft are pivotally mounted on the tubular body. Located within the tubular body is a movable valve closure element that opens and closes the flow passage of the coupler. This element also actuates a central valve of an adjacent adapter that is aligned in series with the central flow passage of the coupler. A second rotatable shaft is mounted within the tubular body for operating the movable valve closure element. Portions of the first and second rotatable shafts extend in substantially parallel relationship. Mounted upon the rotatable shafts is means interconnecting the first rotatable shaft and the second rotatable shaft for both pivoting the adapter latch into locking engagement with the adapter before the valve closure element opens the flow passage and holding the adapter latch in a locked position while the flow passage is open. These shaft interconnecting means enable a single handle to operate both the first and second rotatable shafts. Shaft interlocking means prevent rotation of the first rotatable shaft, as to release the adapter latch from the adapter, when the valve closure element is in a position with the flow passage open.

BRIEF DESCRIPTION OF THE DRAWING

FIG. 1 is a side view of a dry-break coupler embodying the present invention.

FIG. 2 is a longitudinal section of the coupler shown in FIG. 1, with an adapter and a coupling flange of a loading arm being indicated in phantom line.

FIG. 3 is a section similar to FIG. 2, except the coupler and the adapter are shown locked together.

FIG. 4 is a section taken on the line 4—4 of FIG. 1.

FIG. 5 is a front view of the coupler shown in FIG. 1.

FIGS. 6–8 are operational views of the coupler shown in FIG. 1.

DESCRIPTION OF THE PREFERRED EMBODIMENT

A dry-break coupler 10 (FIG. 1) has a tubular body 11 that defines an internal flow passage 12 (FIGS. 2 and 3). At one end of the tubular body is an arcuate catch 13 for engaging an annular locking rib 15 that surrounds a central valve 15 of an adapter 16. This adapter is in accordance with the standards of the American Petroleum Institute Recommended Practice 1004. Pivotally mounted upon the tubular body is an adapter latch 18 for locking the adapter in sealed contact with the coupler so that the central valve of the adapter is aligned in series with the internal flow passage of the coupler. The adapter latch is operated by the first rotatable shaft 19 that is mounted on the tubular body. Within the tubular body is a movable valve closure element 20 for both opening and closing the flow passage and for actuating the central valve of the adapter. A second rotatable shaft 21 has a valve control cam 17, that is eccentrically mounted on the shaft within the tubular body, for operating the movable valve closure element. Portions of the shafts 19 and 21 extend in substantially parallel relationship. With reference to FIG. 1, mounted on the second rotatable shaft at a location outside the tubular body is a shaft control cam 22 having a key receiving slot 23 therein. Mounted for rotation with the first rotatable shaft at a location adjacent the cam 22 is a cam follower lever 24 having a locking key 25 for fitting within the key receiving slot of the cam. Preferably, a corresponding shaft control cam 22' and a cam follower lever 24' are mounted on the opposite side of the tubular body, as shown in FIGS. 4 and 5. The dual cam and locking lever arrangement provides symmetrical loading upon the first and the second rotatable shafts.

Looking now at FIGS. 2 and 3, at one end of the tubular body 11 is a flange 27 that is provided with bolt openings 28. These openings are located on a bolt circle corresponding with the Tank Truck Manufacturers Association Standards. The dry-break coupler 10 can be attached to a gasoline tank truck loading arm 29 by bolts fitting into the bolt openings 28.

With reference to FIG. 4, a pair of center bored bosses 31 and 32 project laterally inward of the tubular body 11 for mounting the shaft 21. Projecting outwardly from the tubular body are a pair of mounting flanges 33 and 34 that support the shaft 19 upon which the adapter latch 18 is mounted. As shown in FIG. 5, the arcuate catch 13 projects radially inward of the tubular body at a location diametrically opposite from the adapter latch for engaging the adapter 16. This catch has an axially inclined bearing surface 35, shown in FIGS. 2 and 3, for engaging the annular locking rib 14 of the adapter, and thereby holding the adapter in contact with an end face 36 of the tubular body.

Within the tubular body 11, near the end face 36, the central bore is stepped to provide a first radial surface 38 and a second radial surface 39. A retainer or nose piece 40 fits within the central bore near the radial surfaces. This nose piece has a radial flange 41 that is positioned opposite the surface 38. An annular wave-spring 42 seats upon the surface 39 and bears against the adjacent end of the nose piece. This spring normally holds the nose piece in a position with the flange 41 spaced outwardly from the surface 38. An O-ring seal 43 fits within a groove 44 in the nose piece for contacting the interior surface of the tubular body 11 between the surfaces 38 and 39. A groove 45 is provided in the nose piece radial end face that is located adjacent the end face 36 of the tubular body. An O-ring seal 46 projects outwardly from the groove 45 to contact the end face of the adapter 16.

The adapter 16 has a valve housing 48 with a central opening 49 that is closed by the poppet-type central valve 15. This valve has a stem 51 that is slidably fitted within a guide, not shown. A compression spring 52 is mounted about the stem, between the guide and the valve, to urge the valve towards a position in sealed engagement with the valve housing. This valve is actuated by the movable valve closure element 20 of the coupler 10. The central valve has an end face 53 that abuts the valve closure element. An O-ring seal 54, that is seated within a peripheral groove 55 in the valve, contacts the inner surface of the housing 48 about the central opening. An annular locking rib 14 projects radially outward of the housing opposite the central opening.

The movable valve closure element 20 has an end face 57 that abuts the end face 53 of the adapter poppet valve 15. A peripheral groove 58 is provided about the valve closure element near the end face. An O-ring seal 59 projects outwardly from this peripheral groove to contact an inner surface of the nose piece 40 when the valve closure element is in a closed position, as shown in FIG. 2. This valve closure element has a stem portion 60 that is provided with a cam receiving slot 61 and a shaft receiving slot 62 that extend transversely of each other. The second rotatable shaft 21 fits through both the slot 62 and the valve control cam 17. This cam fits within the slot 61 for moving the central valve closure element 15. When the valve closure element is in a closed position, as shown in FIG. 2, the cam contacts the tubular body 11 to lock the closure element in place. Upon counterclockwise shaft rotation, as indicated by the arrow 63, the cam engages the stem portion 60 at the forward end of the slot 61 to move the valve closure element forward to a locked open position, as shown in FIG. 3, with the cam contacting the tubular body. Shaft rotation in the opposite direction causes the cam to engage the stem portion at the rear end of the slot 61 to return the valve closure element backward toward the locked closed position shown in FIG. 2.

The shaft 21 is journalled within the center bored bosses 31 and 32 that project inwardly of the tubular body 11. This shaft has a variety of cross-sectional configurations, as shown in FIG. 4. A shaft portion 65 that projects outwardly from the tubular body has a square cross-section, and the shaft control cam 22 fits thereon where it is held in place by a set screw 64 (FIGS. 1 and 5). Extending inwardly from the shaft portion 65 through the boss 31 is a shaft portion 66 that generally has an enlarged circular cross-section. This shaft portion is provided with a peripheral groove 67 for receiving an O-ring seal 68. A mid-portion 69 of the shaft has a square cross-section that fits within a similarly-shaped opening in the valve control cam 17. Extending outwardly from the shaft mid-portion through the boss 32 is a shaft portion 70 that has a circular cross-section of reduced diameter. A sleeve 71 fits about the shaft portion 70 to provide an outside diameter equal to that of the shaft portion 66. A peripheral groove 72 and an O-ring seal 73 are provided between the shaft portion 70 and the sleeve. A peripheral groove 74 and an O-ring seal 75 are provided between the sleeve and the boss 32. A shaft portion 76, that projects outwardly from the tubular body, has a square cross-section, and the shaft control cam 22′ fits thereon where it is held in place by a set screw 64′.

The shaft 21 guides the stem portion 60 of the movable valve closure element 20 as this element moves within the tubular body 11. The outside diameter of the shaft portion 66 and the sleeve 71 is approximately the same dimension as the height of the slot 62. Thus, the stem portion is maintained in a centered position about the shaft as the stem portion moves transversely thereon. The opposite end of the valve closure element is held in a closed central position by the nose piece 40. This end is also held in an open central position by the central valve 15 which bears axially against the end of the valve closure element.

Looking again at FIG. 4, the first rotatable shaft 19 has a portion 80 with a circular cross-section. A portion 81 with a square cross-section extends between the portion 80 and a portion 82 that has a circular cross-section. The portions 80 and 82 provide cylindrical surfaces for turning within sleeve bearings 83 and 84, respectively. The sleeve bearing 83 is seated within an opening in the mounting flange 33, while the sleeve bearing 84 is seated within an opening in the mounting flange 34. The adapter latch 18 fits about the shaft portion 81 in a position between the mounting flanges 33 and 34. The adapter latch pivots with the shaft 19 due to the square cross-section of the shaft portion 81. The cam follower lever 24 is integral with a portion of the shaft that extends outwardly from the mounting flange 33. A cam follower lever 24′ fits upon the opposite end of the shaft extending outwardly from the mounting flange 34. A key 85 fits within keyways in both the lever 24′ and the shaft, to lock these elements together for simultaneous rotation. A set screw 86 extends through the lever 24′ to contact the shaft 19 thereby holding the lever axially in place on the shaft.

With reference to FIG. 5, the adapter latch 18 has a flange 88 with an arcuate transverse shape. This flange has an axially inclined surface 89, as shown in FIGS. 2 and 3, for bearing against the back side of the annular locking rib 14. Pivotal movement of the latch towards the adapter forces the adapter end face into sealing engagement with the O-ring seal 46. The diametrically opposite side of the annular locking rib is forced against the axially inclined bearing surface 35 of the arcuate catch 13. Thus, the adapter latch locks the dry-break coupler 10 in fluid tight sealing engagement with the adapter 16. The adapter latch is urged towards an unlatched position by a spring 90 that has one end mounted upon the adapter latch and an opposite end slidably bearing against the tubular body 11.

An adapter latch lock 91 holds the adapter latch 18 in an open position until the lock is depressed by an adjacent adapter that is in a position to be locked in sealed contact with the coupler. This lock 91 includes a plunger 92 that is slidably fitted within a bore 93 in the tubular body 11. The plunger is urged outwardly of the bore by a spring 94 that is positioned between the inner ends of the plunger and the bore. A gib head 95 projects perpendicularly from the plunger towards the adapter latch. This gib head is normally held by the spring at a location for contact with the adapter that depresses the plunger within the bore 93. The adapter latch has a bore 96 for receiving the gib head and enabling the latch to close when the plunger is depressed by the adapter. When the plunger is in an extended position, the gib head engages the adapter latch adjacent the bore to prevent closing the adapter latch.

Attached to the shaft control cam 22 is an operating handle 98 that has a control knob 99. Both the shaft control cams 22 and 22' have a generally circular shape of a given radius, with the exception of a peripheral portion that has been removed for the key receiving slot 23. At one end of this slot is a camming surface 100 that tapers gently between the radius at the outer periphery of the cam and the radius at the inner periphery of the slot. The opposite end of the slot has a keying surface 101 that makes an abrupt change, almost radially of the cam.

OPERATION

Before attachment to the adapter 16, the dry-break coupler 10 is positioned, as shown in FIG. 6, with the locking key 25 engaged within the key receiving slot 23. The adapter latch 18 is open and the movable valve closure element 20 is closed, blocking the flow passage 12. The coupler is positioned about the annular locking rib 14 of an adapter 16, and the operating handle 98 is rotated forward towards the adapter. The camming surface 100 forces the locking key radially outward from the key receiving slot, causing the cam follower lever 24 to pivot the shaft 19 so that the adapter latch engages the annular locking rib, as shown in FIG. 7. In this position, the coupler is held in fluid sealing engagement with the adapter so that the movable valve closure element can be opened.

As the operating handle 98 is further rotated towards the adapter 16, the outer periphery of the cam 22 holds the locking key 25 of the cam follower lever 24 in an outwardly spaced position, so that the adapter latch 18 maintains the coupler 10 and the adapter in fluid sealing engagement. Within the coupler, the cam 17 forces the movable valve closure element 20 forward towards the open flow passage position shown in FIG. 3. At this time, the operating handle is in the lowered position shown in FIG. 8.

When the operator desires to shut-off the flow, he rotates the operating handle 98 in a reverse manner, from the position shown in FIG. 8 to the position shown in FIG. 7. To unlatch the adapter 16, the operator continues to rotate the operating handle to the position shown in FIG. 6. In this position, the locking key 25 seats within the key receiving slot 23, preventing further reverse rotation of the operating handle.

From the foregoing description, it will be seen that the dry-break coupler 10 can be readily handled by an operator. Only one hand is required to move the single operating handle 98 for both latching the coupler to an adapter 16 and opening the flow passage 12. Safety features are provided to prevent inadvertent operations that could result in the accidental loss of fluid. A simple guide system is provided to prevent the valve closure element from binding. The coupler is latched to the adapter by a simple clamping mechanism.

Although the best mode contemplated for carrying out the present invention has been herein shown and described, it will be apparent that modification and variation may be made without departing from what is regarded to be the subject matter of the invention.

What is claimed is:

1. A dry-break coupler for attachment to an adapter that has an annular locking rib surrounding a central valve, said coupler comprising a tubular body that defines a central flow passage, an adapter latch that is pivotally mounted on the tubular body for locking the adapter in sealed contact with the coupler so that the central valve of the adapter is aligned in series with the central flow passage of the coupler, a first rotatable shaft that is mounted upon the tubular body for operating the adapter latch, a movable valve closure element that is located within the tubular body for both opening and closing the flow passage and for actuating the valved adapter, a second rotatable shaft that is mounted within the tubular body for operating the movable valve closure element, said first and second rotatable shafts having portions that extend in substantially parallel relationship, and means interconnecting the first rotatable shaft and the second rotatable shaft for both pivoting the adapter latch into locking engagement with the adapter before the valve closure element opens the flow passage and holding the adapter latch in a locked position while the flow passage is open, said shaft interconnecting means including at least one shaft control cam mounted upon said second rotatable shaft, and at least one cam follower lever mounted upon said first rotatable shaft for rotating said first rotatable shaft in response to rotation of the shaft control cam.

2. A dry-break coupler as described in claim 1 further including a single handle for operating both the first and second rotatable shafts.

3. A dry-break coupler as described inclaim 2 wherein said handle is mounted upon the shaft control cam.

4. A dry-break coupler as described in claim 2 wherein said shaft interconnecting means further includes interlocking means to prevent rotation of the second rotatable shaft as to open the flow passage of the adapter without first moving the adapter latch to a locked position, said interlocking means also preventing rotation of the first rotatable shaft as to release the coupler adapter latch from the adapter when the valve closure element is in a position with the flow passage open.

5. A dry-break coupler as described in claim 4 wherein said interlocking means includes a key receiving slot within the shaft control cam, and a key portion mounted upon the cam follower lever.

6. A dry-break coupler as described in claim 5 further including an adapter latch lock for holding the adapter latch in an open position until the adapter latch lock is depressed, said adapter latch lock being positioned to be depressed by an adjacent adapter in a position to be locked in sealed contact with the coupler.

7. A dry-break coupler as described in claim 6 wherein said adapter latch lock includes a spring loaded plunger that is slidably fitted within the tubular body, and a gib head that projects from the plunger towards the adapter latch at a location for contact with the adapter as to depress the plunger, said adapter latch having a bore therein for receiving the gib head when the plunger is depressed by the adapter but when the plunger is in an extended position the gib head engages the adapter latch adjacent the bore to prevent moving the adapter latch to a locked position.

8. In a dry-break coupler for attachment to an adapter that has an annular locking rib surrounding a central valve, said coupler having a tubular body that defines a central flow passage, an adapter latch that is pivotally mounted on the tubular body for locking the adapter in sealed contact with the coupler so that the central valve of the adapter is aligned in series with the central flow passage of the coupler, a first rotatable shaft that is mounted upon the tubular body for operating the adapter latch, a movable valve closure element that is located within the tubular body for both opening and closing the flow passage and for actuating the valved adapter, and a second rotatable shaft that is mounted within the tubular body for operating the movable valve closure element, the improvement comprising said first and second rotatable shafts having portions that extend in substantially parallel relationship, and a cam and cam follower means interconnecting the first rotatable shaft and the second rotatable shaft for both pivoting the adapter latch into locking engagement with the adapter before the valve closure element opens the flow passage and holding the adapter latch in a locked position while the flow passage is open.

9. In a dry-break coupler as described in claim 8, said improvement further comprising interlocking means on said means interconnecting the shafts to prevent rotation of the second rotatable shaft as to open the flow passage of the adapter without first moving the adapter latch to a locked position and to prevent rotation of the first rotatable shaft as to release the coupler adapter latch from the coupler when the valve closure element is in a position with the flow passage open.

* * * * *